(12) United States Patent
Bollapalli et al.

(10) Patent No.: US 12,675,801 B2

(45) Date of Patent: Jul. 7, 2026

(54) SYSTEMS AND METHODS FOR IMPLEMENTING A SERIAL ADVISOR

(71) Applicant: Honeywell International Inc., Charlotte, NC (US)

(72) Inventors: Kartikeyan Bollapalli, Bangalore (IN); Srihari Narayanaiah, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 241 days.

(21) Appl. No.: 18/318,330

(22) Filed: May 16, 2023

(65) Prior Publication Data

US 2024/0330961 A1 Oct. 3, 2024

(30) Foreign Application Priority Data

Mar. 29, 2023 (IN) .............................. 202311023123

(51) Int. Cl.
*G06Q 30/018* (2023.01)

(52) U.S. Cl.
CPC ................................. *G06Q 30/0185* (2013.01)

(58) Field of Classification Search
None
See application file for complete search history.

(56) References Cited

U.S. PATENT DOCUMENTS

| | | | |
|---|---|---|---|
| 9,058,615 B2 | 6/2015 | Platek et al. | |
| 10,868,676 B2 | 12/2020 | Nguyen et al. | |
| 11,853,843 B2 * | 12/2023 | Farahat ................... | G06F 21/34 |
| 2004/0112962 A1 * | 6/2004 | Farrall ............... | G08B 13/2442 |
| | | | 235/462.01 |

(Continued)

FOREIGN PATENT DOCUMENTS

| | | |
|---|---|---|
| CN | 103824197 A | 5/2014 |
| CN | 113435556 A | 9/2021 |
| EP | 2452298 A1 | 5/2012 |

OTHER PUBLICATIONS

"Serialization Master Data", Oct. 7, 2022, https://blog.cosmotrace.com/serialization/serialization-master-data.

(Continued)

*Primary Examiner* — Andrew B Whitaker

(74) *Attorney, Agent, or Firm* — Alston & Bird LLP

(57) ABSTRACT

A computer-implemented method of generating a serial identifier for a product is disclosed. The computer-implemented method includes: detecting, at an application platform associated with a computer server, a request to generate the serial identifier for the product; determining, using a processor associated with the computer server, whether context data is available for the product; accessing, responsive to determining that the context data is available for the product, the context data; providing, subsequent to the accessing, the context data for the product to a serial identifier generation component associated with the computer server; receiving, from the serial identifier generation component, an output comprising a recommended serial identifier; and establishing, subsequent to the receiving, the recommended serial identifier received from the serial identifier generation component as the serial identifier for the product. Other aspects are described and claimed.

20 Claims, 5 Drawing Sheets

(56) References Cited

U.S. PATENT DOCUMENTS

| 2011/0276502 A1* | 11/2011 | Dameri | G06Q 30/018 |
| | | | 705/317 |
| 2012/0298743 A1* | 11/2012 | Voloshynovskyy | G07D 7/005 |
| | | | 235/375 |
| 2017/0032382 A1* | 2/2017 | Shulman | G06K 7/10861 |
| 2018/0096175 A1* | 4/2018 | Schmeling | G06F 1/3206 |
| 2023/0289952 A1* | 9/2023 | Soborski | G06T 7/97 |

OTHER PUBLICATIONS

Dennis Brandl, "Serialization, where automation and IT collide" Jan. 21, 2014, https://www.controleng.com/articles/serialization-where-automation-and-it-collide/.

* cited by examiner

SYSTEMS AND METHODS FOR IMPLEMENTING A SERIAL ADVISOR

CROSS-REFERENCE TO RELATED APPLICATION(S)

This application claims the benefit of priority to Indian Provisional Patent Application No. 202311023123, filed Mar. 29, 2023, the entirety of which is incorporated by reference herein.

TECHNICAL FIELD

Various embodiments of the present disclosure relate generally to context-based product serialization and, more particularly, to systems and methods that may generate a robust serial number that is resistant to counterfeit attempts.

BACKGROUND

Product serialization is a process in which a unique identifier (uID) may be assigned to each saleable product. Individual product serialization enables product authentication, limits counterfeiting, and provides end-to-end oversight of a brand's supply chain. Conventional serialization assignment methods are largely static in nature in that they simply assign a product a serial identifier without regard to any type of context data associated with the product. These conventional techniques therefore do little to prevent bad actors from cracking the serialization code and counterfeiting the product. Accordingly, given the foregoing, a need exists for a more dynamic serial recommendation engine that may generate a strong serial configuration based upon one or more contextual parameters.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for generating a context-based product serialization identifier.

In one embodiment, a computer-implemented method for generating a serial identifier for a product is disclosed. The computer-implemented method includes: detecting, at an application platform associated with a computer server, a request to generate the serial identifier for the product; determining, using a processor associated with the computer server, whether context data is available for the product; accessing, responsive to determining that the context data is available for the product, the context data; providing, subsequent to the accessing, the context data for the product to a serial identifier generation component associated with the computer server; receiving, from the serial identifier generation component, an output comprising a recommended serial identifier; and establishing, subsequent to the receiving, the recommended serial identifier received from the serial identifier generation component as the serial identifier for the product.

In accordance with another embodiment, a computer system for generating a serial identifier for a product is disclosed. The computer system includes: a computer server; a serial identifier generation component; one or more computer processors; and a non-transitory computer-readable storage medium storing instructions executable by the one or more computer processors, the instructions when executed by the one or more computer processors causing the one or more computer processors to perform operations including: detecting, at an application platform associated with the computer server, a request to generate the serial identifier for the product; determining, using a processor associated with the computer server, whether context data is available for the product; accessing, responsive to determining that the context data is available for the product, the context data; providing, subsequent to the accessing, the context data for the product to the serial identifier generation component; receiving, from the serial identifier generation component, an output comprising a recommended serial identifier; and establishing, subsequent to the receiving, the recommended serial identifier received from the serial identifier generation component as the serial identifier for the product.

In accordance with another embodiment, a non-transitory computer-readable medium storing instructions executable by one or more computer processors of a computer server is disclosed. The instructions, when executed by the one or more computer processors, cause the one or more computer processors to perform operations including: detecting, at an application platform associated with a computer server, a request to generate the serial identifier for the product; determining, using a processor associated with the computer server, whether context data is available for the product; accessing, responsive to determining that the context data is available for the product, the context data; providing, subsequent to the accessing, the context data for the product to a serial identifier generation component associated with the computer server; receiving, from the serial identifier generation component, an output comprising a recommended serial identifier; and establishing, subsequent to the receiving, the recommended serial identifier received from the serial identifier generation component as the serial identifier for the product.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that avionics data may be retrieved efficiently from legacy and resource constrained platforms though a distributed data acquisition process.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
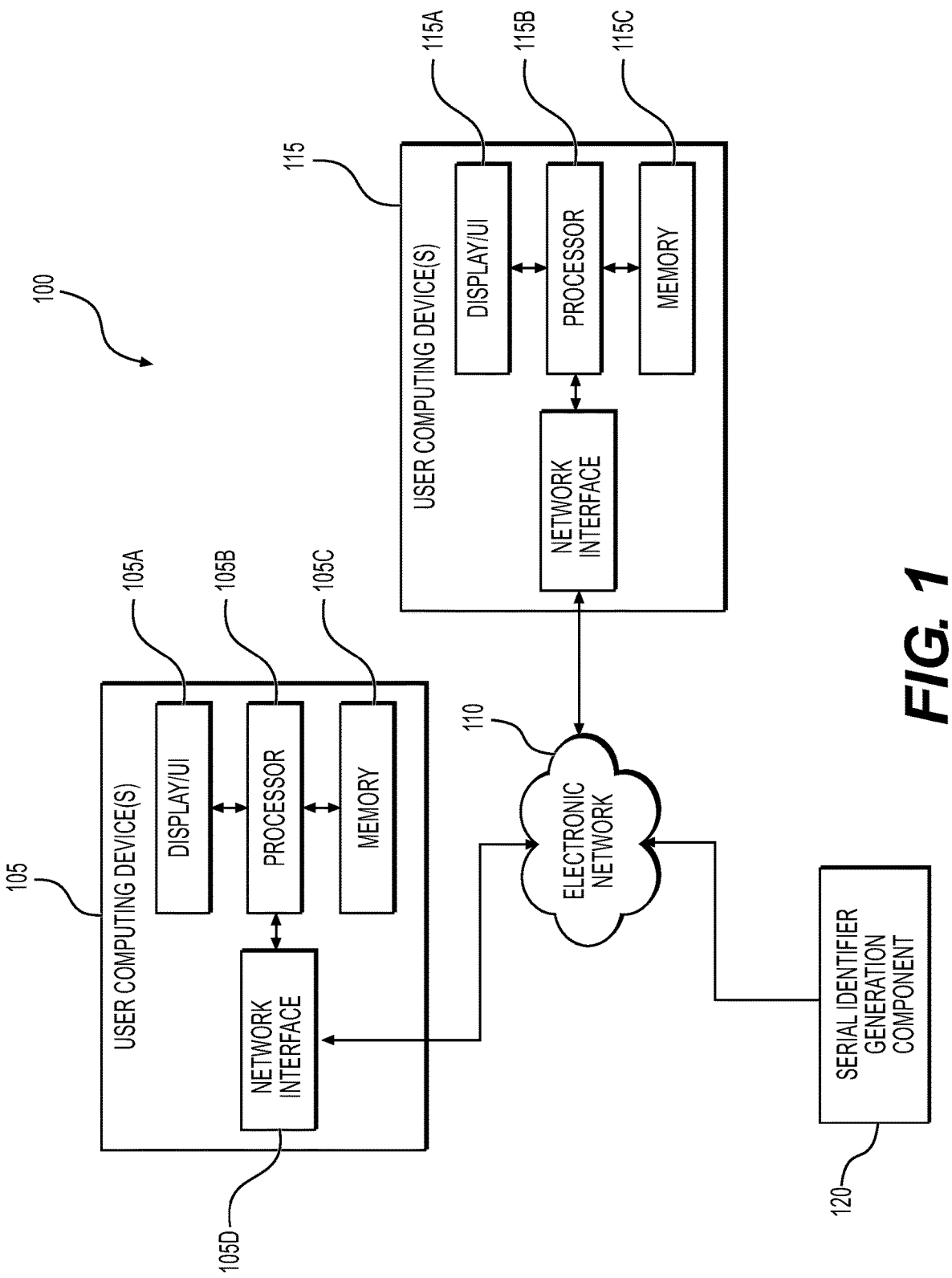
FIG. 1 depicts an exemplary system infrastructure, according to one or more embodiments of the present disclosure.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, systems and methods for generating a context-based product serialization code to assign to saleable goods is described.

As previously alluded to above, consumer products (e.g., electronic devices, appliances, vehicles, jewelry, etc.) may be assigned a unique identity by, e.g., affixing a unique identifier on each product item in the form of a QR code, near field communication (NFC) tag, radio-frequency identification (RFID) tag, and the like. This serialization process provides product manufacturers and/or retailers with end-to-end traceability and enables them to track products back to their origins, determine which supply chain partners handled the products or packaging, identify the specific components that went into a final product, and/or otherwise track a desired product's overall history.

A strong serial identifier may make it more difficult for counterfeiters to crack the serialization. Generating such an identifier involves incorporating one or more of the following configuration parameters into the serial identifier, e.g., serial type (e.g., numeric, alphanumeric, hex representation, universal unique identifier (UUID), etc.), generation strategy (e.g., sequential, random, etc.), serial length, padding characters, prefix, suffix, offset, and the like. In the conventional approach, a human operator may be required to manually select (e.g., via interaction with a dedicated user interface, etc.) the serial configuration based on their native knowledge and experience with the product or product line.

Although generally effective in assigning basic serialization, the conventional approach described above may not be ideal for developing a serial identifier that is optimized for the market context and product sensitivity. More particularly, certain products (e.g., jewelry, in-demand electronics, sensitive instruments, other types of popular goods, etc.) may be more susceptible to counterfeiting than others (e.g., generic consumer goods, conventional household items, other common and/or low-value products, etc.). By assigning serial identifiers to products without consideration of any deeper context, goods having dramatically different values and/or sensitivities may be assigned similar strength serial identifiers. For example, under the conventional approach, a common household item that has very little risk of being counterfeit may be assigned a serial identifier having the same strength as one assigned to a high-value luxury item, which has a high likelihood of being counterfeit.

Additionally to the foregoing, because the generation of a strong serial identifier involves the utilization of a variety of configuration parameters, there is a chance that human error may inadvertently produce a weak serial identifier with respect to a product type, which may be more easily cracked by counterfeiters. Furthermore, because conventional serial configuration is reliant on the native knowledge and experience of the human operator, a product manufacturer may need to spend more time and money to train new operators as their business grows, which may be time-consuming, burdensome, and resource-intensive.

Accordingly, in view of all of the foregoing issues associated with the conventional serial generation processes, the following embodiments describe systems and methods for generating a serial identifier that may be counterfeit-resistant and contextually appropriate for the nature of the product. According to certain aspects of the present disclosure, a request may be detected at an application platform to generate a serial identifier for a product. A computer server of a system environment may determine whether any context data associated with the product is available (e.g., general product master data, supply chain data, counterfeit data, etc.). Responsive to determining that context data does exist, the server may transmit the context data to a trained machine learning model configured to generate a context-based serial identifier. The server may thereafter transmit an output result, which may include a recommended serial identifier based on the product context, to an application platform (e.g., a manufacturer portal, etc.) for user review.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Furthermore, presented below are various aspects of machine-learning techniques that may be adapted to automatically assign a serial identifier to a product based on its associated context data. As will be discussed in more detail below, machine-learning techniques adapted to assign serial identifiers based on context data may include one or more aspects according to this disclosure, e.g., a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

FIG. 1 depicts an exemplary block diagram of a system environment 100 configured to dynamically generate serial identifiers based on product context, according to one or more embodiments of the present disclosure. The system environment 100 may include a user computing device 105 operated by a user, an electronic network 110, a computer server 115, and a serial identifier generator 120. One having skill in the art would recognize that the computer server 115 may configure the one or more user computing devices 105 so as to experience different functionalities and/or have access to different information (e.g., determined by operator credentials such as user ID/password).

The user computing device 105, the computer server 115, and/or the serial identifier generator 120 may be connected via the network 110, using one or more standard communication protocols. The computer server 115 and/or serial identifier generator component 120 may be configured to receive data over the network 110 from the user computing device 105, including, but not limited to, contextual product data, serial identifier generation requests for a single product or a plurality of product(s) (e.g., a product line, etc.). The contextual product data may include general product data, supply chain data, counterfeit data related to the product, and the like. Each of the foregoing types of context data are further defined herein.

As shown in FIG. 1, the computer server 115 may be in communication with the user device 105 to transmit and receive data, messages, and/or instructions from each other across the network 110. The user device 105 may be associated with human users/operators who are employed by a company to perform and/or oversee product serialization. The network 110 may comprise one or more networks that connect devices and/or components of environment 100 to allow communication between the user device 105, the computer server 115, and the serial identifier generator component 120. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of environment 100. In some embodiments, the network 110 may be implemented using cell and/or pager networks, satellite, licensed radio, or a combination of licensed and unlicensed radio. The network 110 may be associated with a cloud platform that stores data and information related to methods disclosed herein.

The user computing device 105 may include a display/user interface (UI) 105A, a processor 105B, a memory 105C, and/or a network interface 105D. The user computing device 105 may be a personal computer (PC), a tablet PC, a personal digital assistant (PDA), a mobile device, a palmtop computer, a laptop computer, a desktop computer, etc. The user computing device 105 may execute, by the processor 105B, an operating system (O/S) and at least one application (each stored in memory 105C). The application may be a browser program or a mobile application program (which may also be a browser program in a mobile O/S). The application may be a product overview application that may enable users to see and enter information associated with different product lines. In this regard, the application may generate one or more interactive graphical user interfaces (GUIs) based on the instructions/information received from the computer server 115. In some embodiments, the application may generate one or more interactive GUIs based on instructions/information stored in the memory 105C. The interactive GUIs may be application GUIs for the application executed based on XML and Android programming languages or Objective-C/Swift, but one skilled in the art would recognize that this may be accomplished by other methods, such as webpages executed based on HTML, CSS, and/or scripts, such as JavaScript. The display/UI 105A may be a touch screen or a display with other input systems (e.g., mouse, keyboard, etc.). The network interface 105D may be a TCP/IP network interface for, e.g., Ethernet or wireless communications with the network 110. The processor 105B, while executing the application, may receive user inputs from the display/UI 105A, and perform actions or functions in accordance with the application or other related applications.

The computer server 115 and the serial identifier generator component 120 may be one server computer device and a single database, respectively. Alternatively, in one or more embodiments, the computer server 115 may be a server cluster, or any other collection or network of a plurality of computer servers. The serial identifier generator component 120 also may be a collection of a plurality of interconnected databases. The server 115 and the serial identifier generation component 120 may be components of one server system. Additionally, or alternatively, the computer server 115 and the serial identifier generation component 120 may be components of different server systems, with the network 110 serving as the communication channel between them. The computer server 115 and the serial identifier generation component 120 may be associated with an entity, such as a product-producing and/or delivering company or organization. In some embodiments, the computer server 115 and the serial identifier generation component 120 may collectively be referred to as an entity system.

The computer server 115 may include a display/UI 115A, a processor 115B, a memory 115C, and/or a network interface 115D. The computer server 115 may be a computer, system of computers (e.g., rack server(s)), and/or or a cloud service computer system. The computer server 115 may execute, by the processor 115B, an operating system (O/S) and at least one instance of a server program (each stored in memory 115C). The computer server 115 may store or have access to information from serial identifier generator component 120. The display/UI 115A may be a touch screen or a display with other input systems (e.g., mouse, keyboard, etc.) for an operator of the computer server 115 to control the functions of the computer server 115 (e.g., update the server program and/or the server information). The network interface 115D may be a TCP/IP network interface for, e.g., Ethernet or wireless communications with the network 110. The server program, executed by the processor 115B on the computer server 115, may be configured to transfer and/or process data going to and/or coming from the serial identifier generation component 120. For instance, the processor 115B may be configured to perform a normalization process on raw product context data prior to introduction to the serial identifier generation component, as will be described in further detail below. As described above, the computer server 115 may store various types of data associated with a product such as, for example, general product data, supply chain data, counterfeit data, etc.

As described above, the serial identifier generation component 120 may store data associated with various products and/or product lines. In addition to the context data, the serial identifier generation component 120 may also store additional data received from user computing devices 105, including real time and/or near real time feedback input from operators of the user computing devices 105. The serial identifier generation component 120 may be configured to transmit recommendations to the user computing devices 105 and/or the computer server 115, such as recommendations for serial identifiers for specific products or product lines. The computer server 115 may be configured to store information associated with each product or product line, including the recommendations for serial identifiers generated by the serial identifier generation component 120, in a memory 115C. In some embodiments, the computer server 115 may also be configured to store user profiles associated with each user, or operator, of the user computing device 105. The user profile may contain various information, such as, for example, experience data indicating an operator's level of experience analyzing and/or assigning serial identifiers to products.

Figure 2:
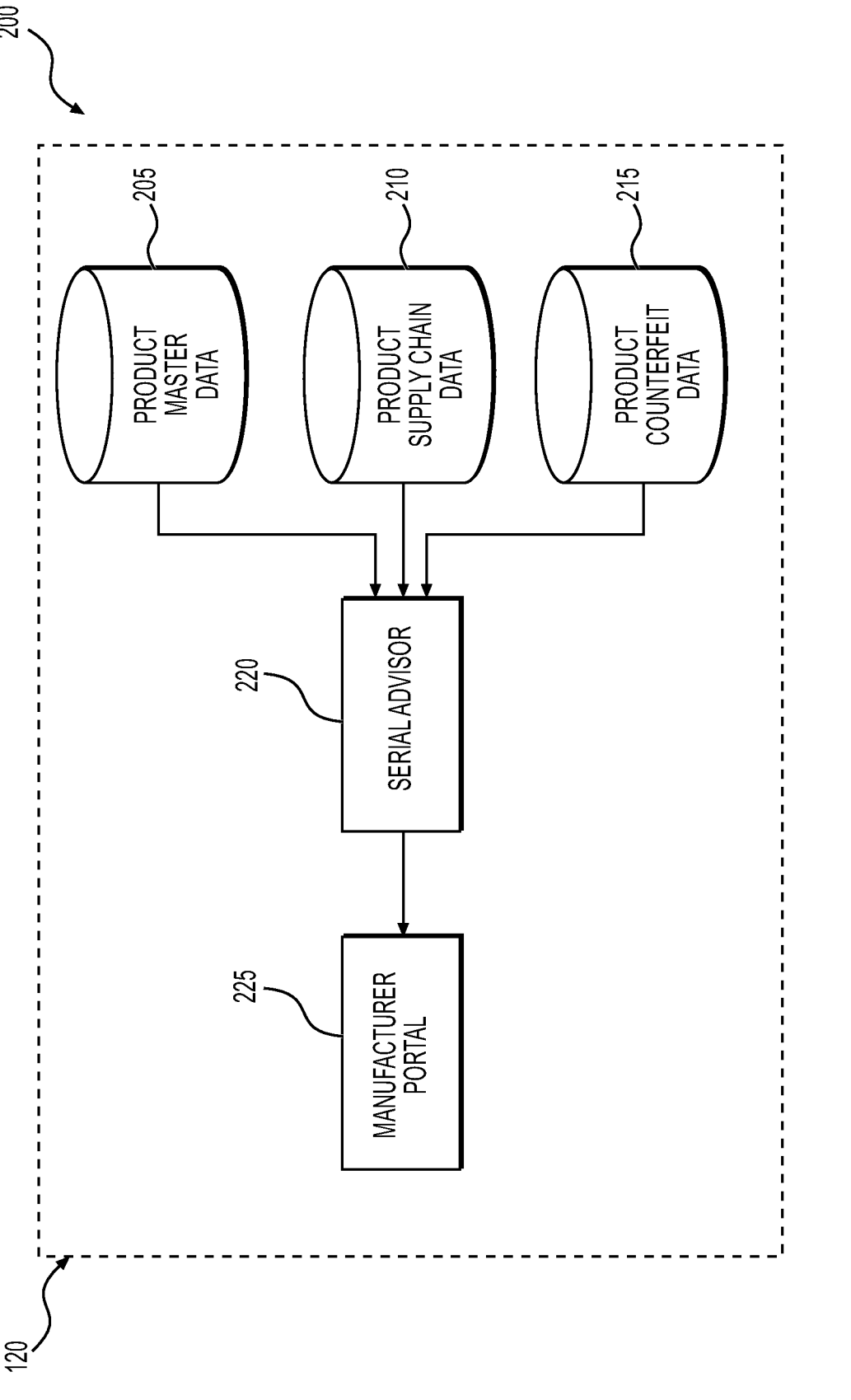
FIG. 2 depicts an exemplary serial identifier generation component, according to one or more embodiments of the present disclosure.

Referring now to FIG. 2, a process flow 200 of the exemplary functionality of serial identifier generator component 120 is provided. The data types and/or components involved in the process flow 200 include product context data 205, 210, 215, a serial advisor component 220, and a manufacturer portal 225.

In an embodiment, various types of context data associated with a product or product line may be received at the serial identifier generator component 120 (e.g., from the user computing device 105, from the computer server 115, a combination thereof, etc.). For instance, the serial identifier generator component 120 may receive product master data 205 (e.g., product segment information, product value information, product functionality information, etc.), product supply chain data 210 (e.g., geographic location of the product distributors, location of manufacture and/or distribution, prevalence of counterfeit enforcement laws and policies in the foregoing locations, threat perception levels associated with product transport, product transport means (e.g., truck, boat, plane, etc.), etc.), and/or product counterfeit data 215 (e.g., counterfeit trend data, counterfeit likelihood data, etc.).

In an embodiment, some or all of the listed context data types 205, 210, 215 may be provided to a serial advisor component 220. The serial advisor component 220 may be a module that contains a machine learning model that may be trained to provide an output recommendation for a context-based serial identifier that is optimized based on the input context data. As used herein, a "machine-learning model" generally encompasses instructions, data, and/or a model configured to receive input, and apply one or more of a weight, bias, classification, or analysis on the input to generate an output. The output may include, for example, an analysis based on the input, a prediction, suggestion, or recommendation associated with the input, a dynamic action performed by a system, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine-learning techniques, such as k-nearest neighbors, linear regression, logistical regression, random forest, gradient boosted machine (GBM), support-vector machine, deep learning, a deep neural network, and/or any other suitable machine-learning technique that solves problems in the field of Natural Language Processing (NLP). Supervised, semi-supervised, and/or unsupervised training may be employed. For example, supervised learning may include providing training data and labels corresponding to the training data, e.g., as ground truth. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

Prior to introduction to a machine learning infrastructure of the serial advisor component 220, the raw context data 205, 210, 215 may be processed and normalized (e.g., via one or more processors such as processor 105B and/or processor 115B, etc.). As used herein, the term "normalize" may refer to the transformation of a value or a set of values to a common frame of reference for comparison purposes. In this regard, one or more normalization algorithms or techniques (e.g., min-max normalization, z-score normalization, decimal scaling, logarithmic transformation, root transformation, etc.) may be leveraged to bring all data attributes in the context data onto the same scale. Such a process may correspondingly improve the performance of the machine learning model in the serial advisor 220 by reducing the impact of any outliers and by improving the accuracy of a trained machine learning model associated therewith.

Figure 3:
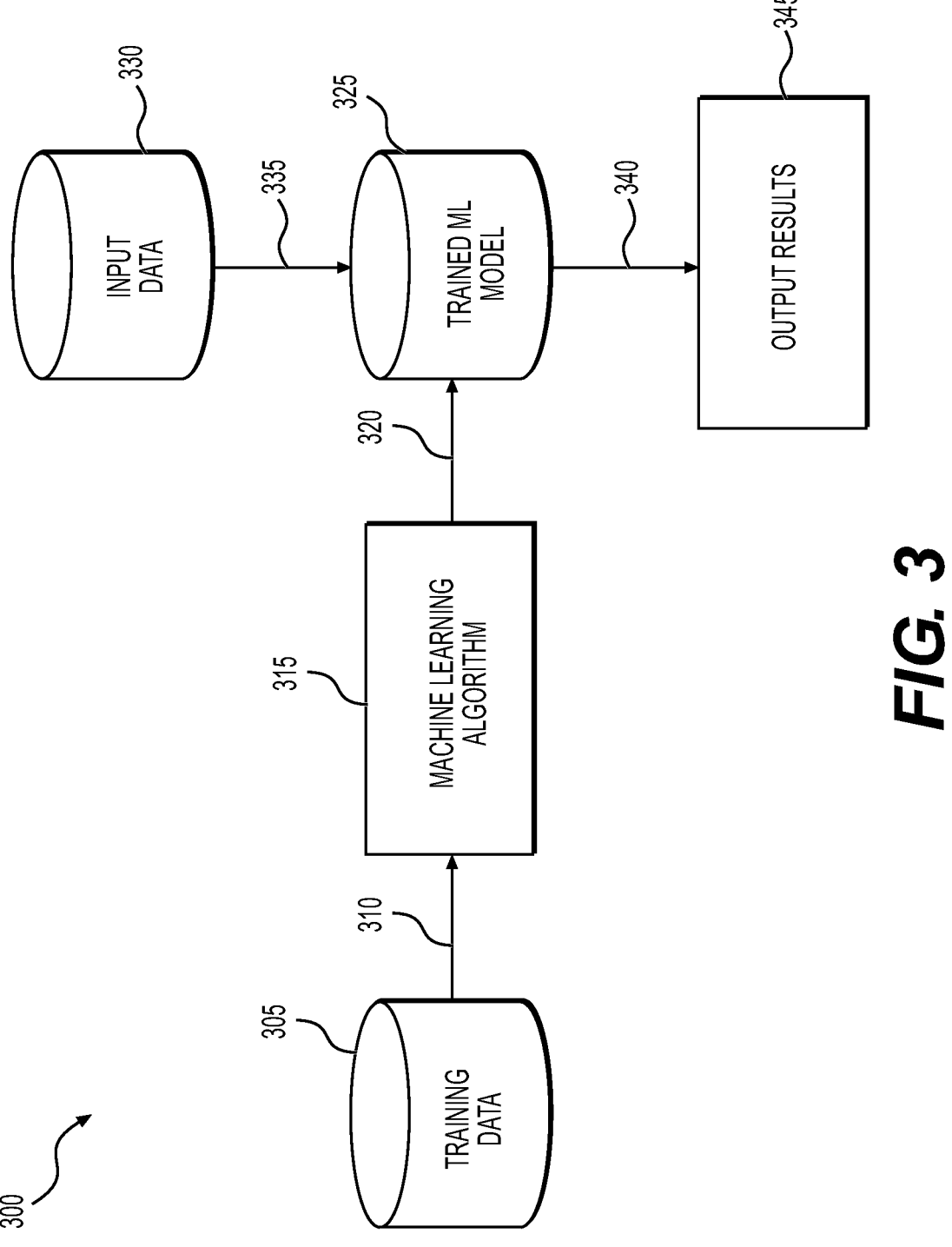
FIG. 3 depicts a flow diagram for training and deploying an exemplary machine learning model, according to one or more embodiments of the present disclosure.

FIG. 3 depicts a flow diagram 300 of an exemplary process for training and deploying the machine learning model of the serial advisor component 220 via a supervised learning process. In an embodiment, training data 305 for the machine learning model may first be obtained (e.g., from the computer server 115). The training data 305 may be composed of the normalized context data labeled with particular outputs to enable the machine learning model to recognize certain desired associations. For example, all products having a value above a predetermined monetary threshold may be labeled as "high value-increased counterfeit risk" whereas products below the predetermined monetary threshold may be labeled as "common value-low counterfeit risk". In another example, all products of a certain category (e.g., jewelry) may be labeled as "high value—increased counterfeit risk" whereas products of a different category (e.g., cooking utensils) may be labeled as "common value—low counterfeit risk". In yet another example, all products distributed in geographic areas known for having weak counterfeit enforcement protocols may be labeled "counterfeit likelihood probable—increased counterfeit risk" whereas other products distributed in other geographic areas known for having standard or strong counterfeit enforcement protocols may be labeled as "counterfeit likelihood improbable—low counterfeit risk". In yet another example, all products having a historic reputation for being subject to counterfeit activity may be labeled as "counterfeit likelihood probable—increased counterfeit risk" whereas other products having a low historic reputation for being subject to counterfeit activity may be labeled as "counterfeit likelihood improbable-low counterfeit risk".

The training data 305 may thereafter may be applied, at step 310, to a machine learning algorithm 315 to train an untrained machine learning model to recognize the likelihood that a product will be subject to counterfeit activity based on the collective nature of the labeled context data. For instance, an untrained machine learning model may be trained to classify products having context data patterns indicating that they are of a high value, rare, being transported or distributed through suspect geographic locations, etc., as likely counterfeit targets. This training phase may ultimately generate, at step 320, a trained machine learning model that may thereafter receive, at step 335, input data 330. Here, the input data 330 may correspond to normalized context information associated with a new product for which a serial identifier needs to be derived for. The trained machine learning model 325 may process the input data 330 to generate, at step 340, an output result 345. In an embodiment, the output result 345 may be a recommendation for a serial identifier to assign to the product that contains configuration parameters commensurate with the determined likelihood that the product will be subject to counterfeit activity.

Referring back to FIG. 2, an output result from the serial advisor component 220 may be transmitted to a manufacturer portal 225. In an embodiment, the manufacturer portal 225 may be an application platform that a human operator may interact with to manage product serialization. In this regard, output results, which may include a serial identifier recommendation generated by a trained machine learning model of the serial advisor component 220, may be transmitted to the manufacturer portal 225 and may be presented for operator review. Upon approval by the human operator, the machine-recommended serial identifier may be assigned to a particular product or product line. Conversely, if the human operator does not approve of the recommended serial identifier (e.g., because they believe the configuration parameters are not strong enough for the product, because they believe the configuration parameters are unnecessarily strong for the product, etc.) then they may utilize the application platform of the manufacturer portal 225 to request the serial advisor component 220 to generate a new serial identifier.

Figure 4:
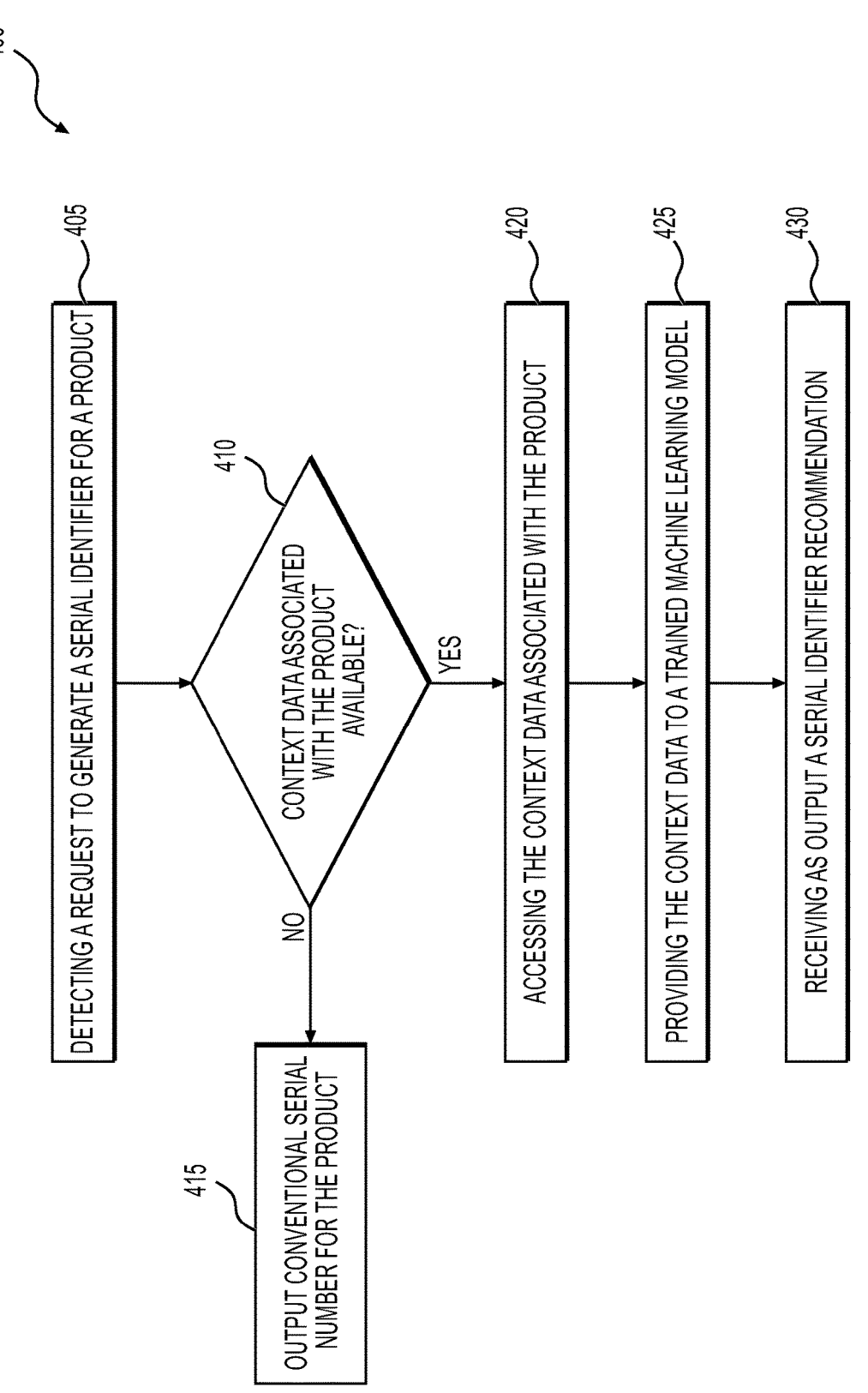
FIG. 4 depicts a flowchart of an exemplary method for generating a context-based serial identifier, according to one or more embodiments of the present disclosure.

Referring now to FIG. 4, a flowchart is illustrated of an exemplary method 400 of generating a context-based serial identifier, according to one or more aspects of the present disclosure. Exemplary process flows of the method 400, performed in accordance with the exemplary system environment 100 above, and also in accordance with the serial identifier generation component 120 depicted in FIG. 2 and the exemplary machine learning model depicted in FIG. 3, are described hereinafter.

At step 405, a request to generate a serial identifier may be received at an application platform of a manufacturer portal 225 associated with the system environment 100. In an embodiment, the request may be a manual request made by a human operator. For instance, the operator may navigate through the application platform to first select a product and thereafter select an option to generate a serial identifier for that product. In another embodiment, the request may be inherent and/or automatic. For instance, the computer server 115 may receive information associated with each new product for a product line. Upon receiving an indication that the product has been developed, or is planned to be developed, the computer server 115 may dynamically initiate, without additional human input, a serial identifier generation request.

At step 410, the computer server 115 may determine whether context data associated with the product exists. Exemplarily types of context data include, but are not limited to: general product data (e.g., product segment information, product value information, product functionality information, etc.), product supply chain data (e.g., geographic location of the product distributors, location of manufacture and/or distribution, prevalence of counterfeit enforcement laws and policies in the foregoing locations, threat perception levels associated with product transport, product transport means (e.g., truck, boat, plane, etc.), etc.), and/or product counterfeit data (e.g., counterfeit trend data, counterfeit likelihood data, etc.). Responsive to determining, at 410, that context data associated with the product does not exist, the computer server 115 may output, at 415, a conventional serial identifier for the product (e.g., a sequential number, etc.). Conversely, responsive to determining, at 410, that context data associated with the product does exist, the computer server 115 may access, at 420, the context data. In an embodiment, the context data may be stored in an accessible database (e.g., on the computer server 115, on the user computing device 105, another accessible storage location, etc.)

At step 425, the computer server 115 may provide the context data to a serial identifier generation component 120. The serial identifier generation component 120 may operate generally using the process flow illustrated and described above with reference to FIG. 2. In an embodiment, the serial identifier generation component 120 may contain a trained machine learning model, such as the one depicted in FIG. 3, that is configured to generate a context-based serial identifier based upon the context data associated with the product. For instance, the trained machine learning model may be configured to assign a stronger and/or more complicated serial identifier to those products determined to be likely candidates for counterfeiting based on the collective elements of the associated context data.

In some embodiments, after generation of the context-based serial identifier, the computer server 115 may initiate a duplication protocol that may be configured to ensure that the machine-generated serial identifier is not already in active use on another product. Responsive to the duplication protocol determining that a duplicate exists, the serial identifier generation component 120 may be configured to output another result. For example, the serial advisor 220 may be instructed to output its $2^{nd}$ best serial identifier output. In certain situations, the computer sever 115 may maintain the assigned serial identifier for the new product even if it is a duplicate. For instance, if a previous product that shares the same serial identifier has been discontinued, or is soon to be discontinued, then the computer server 115 may maintain the serial identifier for the new product. In another example, a previous product (e.g., a common household item, etc.) that shares the same serial identifier as the new product (e.g., a high value item, etc.) may have been assigned an unnecessarily strong serial identifier based on its context data. Rather than develop another serial identifier for the new product, the computer server 115 may generate an updated serial identifier for the older product that is more in line with its inherent context.

At step 430, the computer server 115 may receive output from the serial identifier generation component 120 that includes a context-based serial identifier recommendation. In an embodiment, this output may be provided to the application platform associated with the manufacturer portal 225 and may include a machine-generated serial identifier based on the context data. In an embodiment, the output may also contain an indication of the relative strength of the context-based serial identifier and/or an explanation regarding why certain configuration parameters were utilized in its generation. In such an embodiment, the explanation may be more expansive for newer operators than for more seasoned operators. More particularly, the computer server 115 may have access to a user profile of the operator that is reviewing the recommended serial identifier. The user profile may contain various information about the operator, including their general experience level assigning and/or analyzing serial identifiers. Upon identifying that the operator is relatively inexperienced (e.g., an operator that has under one year of experience, etc.), the computer server 115 may generate a longer explanation that provides more details on why such a serial identifier was generated. Conversely, for more experienced operators, the computer server 115 may generate no explanation at all or may just provide a short synopsis of why the resultant serial identifier was generated.

The computer server 115 may assign, subsequent to receipt of an authorization command from a human operator, the context-based serial identifier to the product. Alternatively, in another embodiment, the computer server 115 may automatically assign the generated context-based serial identifier to a product without receiving any additional operator input. In an embodiment, if an operator is not satisfied with the machine-generated serial identifier, then they may interact with the application platform to request that a new serial identifier be generated. In this situation, the serial advisor 220 may be instructed to output its $2^{nd}$ best serial identifier recommendation. Additionally or alternatively, the operator may be enabled to provide additional guidelines to the serial identifier generation component 120 to further shape its updated recommendation. For example, the operator may define certain configuration parameters that they would like utilized in the generation of the serial identifier for a specific product, product line, product type, etc. In an embodiment, the serial advisor 220 may collectively treat requests by operators to generate new serial identifiers, along with any additional operator-provided guidelines, as training input. In this way, the serial advisor 220 may be configured to continually learn and adapt to operator preferences.

In an embodiment, the system environment 100 may dynamically initiate one or more other complementary actions based on the context data associated with the product and/or on the nature of the recommended serial identifier. For example, responsive to identifying that the assigned serial identifier for a product has a complex set of configuration parameters, therefore indicating that it is high-value and/or likely to be subject to counterfeiting activity, the computer server 115 of the system environment 100 may provide one or more recommendations for other actions that can be taken to provide additional security for the product. For instance, the computer server 115 may suggest an alternate product distribution path that avoids locations of high counterfeit activity. Additionally or alternatively, in another example, the computer server 115 may provide a recommendation for retailers of the product to position it in specific locations in a store during sale (e.g., behind protective glass, etc.).

Figure 5:
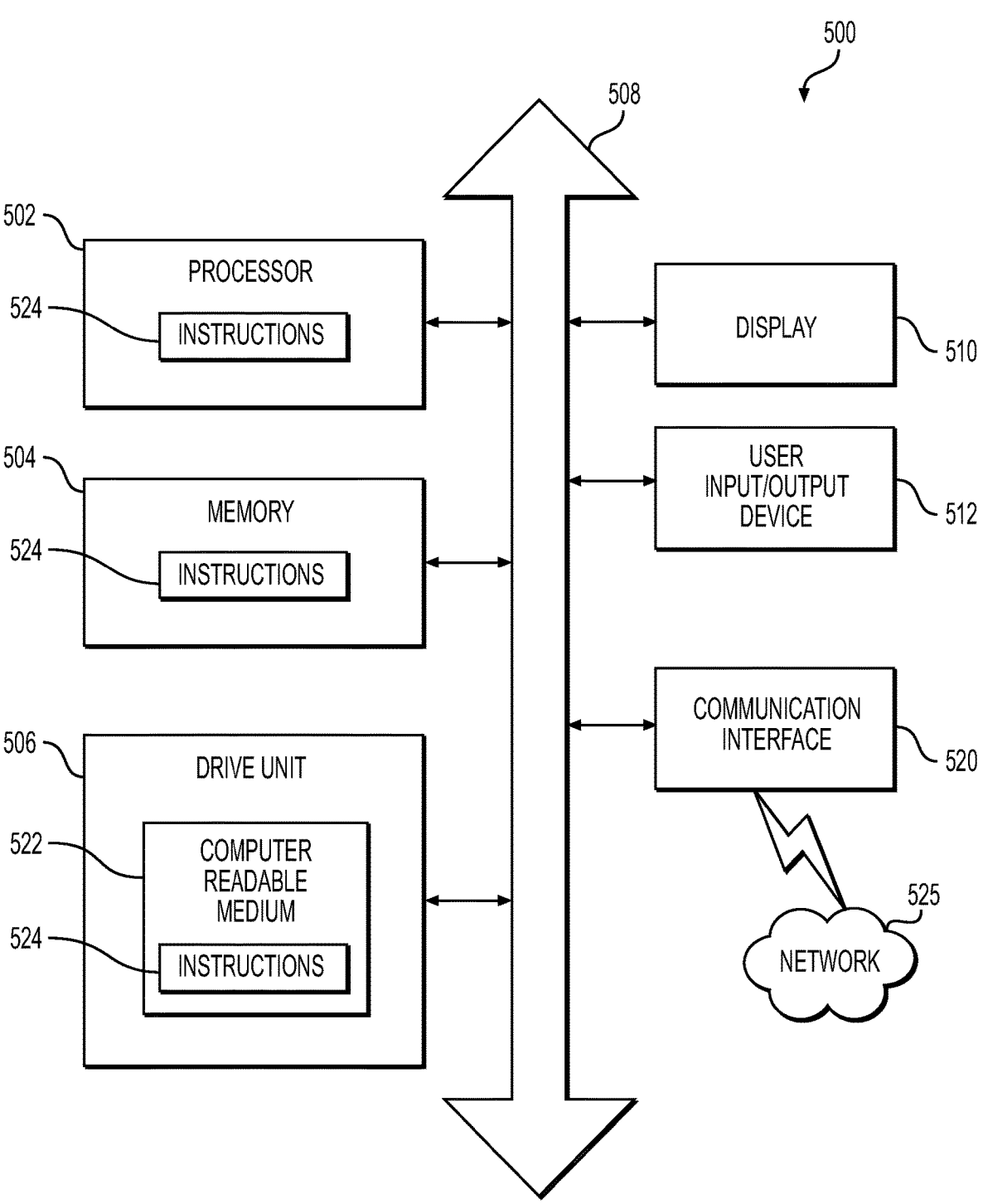
FIG. 5 depicts an exemplary computing server, according to one or more embodiments of the present disclosure.

In general, any process discussed in this disclosure that is understood to be computer-implementable, such as the process illustrated in FIG. 5, may be performed by one or more processors of a computer system, such as system environment 100, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer server. A processor may be a central processing unit (CPU), a graphics processing unit (GPU), or any suitable types of processing unit.

A computer system, such as system environment 100, may include one or more computing devices. If the one or more processors of the computer system are implemented as a plurality of processors, the plurality of processors may be included in a single computing device or distributed among a plurality of computing devices. If a computer system 100 comprises a plurality of computing devices, the memory of the computer system 100 may include the respective memory of each computing device of the plurality of computing devices.

FIG. 5 is a simplified functional block diagram of a computer system 500 that may be configured as a computing device for executing the process illustrated in FIG. 4 according to exemplary embodiments of the present disclosure. FIG. 5 is a simplified functional block diagram of a computer that may be configured as according to exemplary embodiments of the present disclosure. In various embodiments, any of the systems herein may be an assembly of hardware including, for example, a data communication interface 520 for packet data communication. The platform also may include a central processing unit ("CPU") 502, in the form of one or more processors, for executing program instructions. The platform may include an internal communication bus 508, and a storage unit 506 (such as ROM, HDD, SDD, etc.) that may store data on a computer readable medium 522, although the system 500 may receive programming and data via network communications. The system 500 may also have a memory 504 (such as RAM) storing instructions 524 for executing techniques presented herein, although the instructions 524 may be stored temporarily or permanently within other modules of system 500 (e.g., processor 502 and/or computer readable medium 522). The system 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other tele-communication networks. Such communications, for example, may enable loading of the software from one computer or processor into another, for example, from a management server or host computer of the mobile com-munication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Furthermore, while some embodiments described herein include some but not other features included in other embodiments, combinations of features of different embodi-ments are meant to be within the scope of the invention, and form different embodiments, as would be understood by those skilled in the art. For example, in the following claims, any of the claimed embodiments can be used in any com-bination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method comprising:
   receiving, at an application platform associated with a computer server, a request to programmatically gener-ate a unique context-based serial identifier for a prod-uct;

obtaining by a serial identifier generation component associated with the computer server, context data asso-ciated with the product;
   generating, by a serial identifier generation component using a machine learning model and based on the context data, output comprising a recommended serial identifier and indication of a strength of the recom-mended serial identifier, wherein the machine learning model is trained using a training dataset that is gener-ated by:
      identifying training context data,
      performing normalization operation on the training context data to generate normalized context data,
      determining a classification label for the training con-text data based at least in part on the normalized context data, wherein the classification label is indicative of a likelihood of counterfeit activity, and
      generating the training dataset based at least in part on the normalized context data and the classification label,
   wherein training the machine learning model comprises applying the training dataset to a machine learning based algorithm to train an untrained machine learning model for determining configuration parameters for context-based serialization task based at least in part on the likelihood of counterfeit activity,
      electronically transmitting the output comprising the rec-ommended serial identifier to a portal corresponding to the application platform;
      providing, in response to determining that the recom-mended serial identifier is associated with a complex set of configuration parameters, an alternate product distribution path that avoids geographic locations of high counterfeit activity; and
      establishing the recommended serial identifier as the unique context-based serial identifier for the product.

2. The computer-implemented method of claim 1, wherein the establishing comprises:
   transmitting, using the computer server, instructions to a user computing device hosting the application platform to display the recommended serial identifier; and
   establishing, responsive to receiving user authorization input, the recommended serial identifier as the serial identifier for the product.

3. The computer-implemented method of claim 1, wherein the establishing comprises:
   transmitting, using the computer server, instructions to a user computing device hosting the application platform to display the recommended serial identifier;
   detecting, from the user computing device, a rejection indication of the recommended serial identifier pro-vided a user;
   providing, based on the detected rejection indication, instructions to the serial identifier generation compo-nent to generate another recommended serial identifier;
   transmitting, using the computer server and upon receiv-ing the another recommended serial identifier from the serial identifier generation component, instructions to the user computing device to display the another rec-ommended serial identifier; and
   establishing, responsive to receiving user authorization input, the another recommended serial identifier as the serial identifier for the product.

4. The computer-implemented method of claim 1, wherein the establishing comprises automatically establishing, without receipt of any additional user input, the recommended serial identifier as the serial identifier for the product.

5. The computer-implemented method of claim 1, wherein the product is a developed product or an anticipated product.

6. The computer-implemented method of claim 1, further comprising initiating a duplication protocol on the recommended serial identifier, wherein the initiating the duplication protocol comprises:

accessing a database of active serial identifiers associated with other products;

comparing the recommended serial identifier to any of the active serial identifiers;

determining whether a match exists between the recommended serial identifier and any of the active serial identifiers; and providing, responsive to determining that the match exists, an instruction to the serial identifier generation component to generate another recommended serial identifier.

7. The computer-implemented method of claim 1, wherein the machine learning model is configured to:

programmatically classify one or more products as potential counterfeit targets in response to the one or more products having context data patterns indicating that they are one or more of (i) a value above a predetermined monetary threshold indicative of increased counterfeit risk, (ii) rare, being transported or distributed through suspect geographic locations.

8. The computer-implemented method of claim 7, wherein training the machine learning model further comprises:

programmatically configuring the machine learning model to tailor a complexity of the recommended serial identifier based upon the likelihood of counterfeit activity associated with the product as identified in the context data.

9. The computer-implemented method of claim 8, wherein the machine learning model is trained to:

programmatically assign a stronger and/or more complicated serial identifier to the product determined to be a likely candidate for counterfeiting based on the context data including counterfeit data.

10. The computer-implemented method of claim 9, wherein the computer-implemented method further comprises:

in response to programmatically identifying that the assigned stronger and/or more complicated serial identifier for the product has a complex set of configuration parameters, initiating one or more context-based serial identifier based on the context data and/or the recommended serial identifier.

11. The computer-implemented method of claim 10, wherein the computer-implemented method comprising operations further including:

enabling providing additional security for the product based on the programmatically initiated the one or more context-based serial identifier recommendations.

12. The computer-implemented method of claim 11, wherein enabling providing additional security for the product further including:

avoiding the suspect geographic locations of the counterfeit activity according to the alternate product distribution path.

13. The computer-implemented method of claim 1, wherein the computer-implemented method comprising operations further including:

implementing a serial advisor for the serial identifier generation component to generate the unique context-based serial identifier for the product;

deploying context-based product serialization in the serial advisor to generate the unique context-based serial identifier as a robust serial number which is resistant to one or more counterfeit attempts; and training the machine learning model to provide an output recommendation for the unique context-based serial identifier that is optimized based on input context data.

14. The computer-implemented method of claim 13, wherein the computer-implemented method comprising operations further including:

leveraging one or more normalization algorithms to bring all data attributes in the context data onto a same scale to improve performance of the machine learning model in the serial advisor by:

reducing an impact of any outliers, and improving an accuracy of the machine learning model associated with the one or more normalization algorithms.

15. A computer system comprising:

a computer server;

a serial identifier generation component;

one or more computer processors; and a non-transitory computer-readable storage medium storing instructions executable by the one or more computer processors, the instructions when executed by the one or more computer processors causing the one or more computer processors to perform operations including:

receiving, at an application platform associated with a computer server, a request to programmatically generate a unique context-based serial identifier for a product;

obtaining by a serial identifier generation component associated with the computer server, context data associated with the product;

generating, by a serial identifier generation component using a machine learning model and based on the context data, output comprising a recommended serial identifier and indication of a strength of the recommended serial identifier, wherein the machine learning model is trained using a training dataset that is generated by:

identifying training context data, performing normalization operation on the training context data to generate normalized context data, determining a classification label for the training context data based at least in part on the normalized context data, wherein the classification label is indicative of a likelihood of counterfeit activity, and generating the training dataset based at least in part on the normalized context data and the classification label, wherein training the machine learning model comprises applying the training dataset to a machine learning based algorithm to train an untrained machine learning model for determining configuration parameters for context-based serialization task based at least in part on the likelihood of counterfeit activity, electronically transmitting the output comprising the recommended serial identifier to a portal corresponding to the application platform;

providing, in response to determining that the recommended serial identifier is associated with a complex set of configuration parameters, an alternate product distribution path that avoids geographic locations of high counterfeit activity; and establishing the recommended serial identifier as the unique context-based serial identifier for the product.

16. The computer system of claim 15, wherein the establishing comprises:

transmitting, using the computer server, instructions to a user computing device hosting the application platform to display the recommended serial identifier; and establishing, responsive to receiving user authorization input, the recommended serial identifier as the serial identifier for the product.

17. The computer system of claim 15, wherein the establishing comprises:

transmitting, using the computer server, instructions to a user computing device hosting the application platform to display the recommended serial identifier;

detecting, from the user computing device, a rejection indication of the recommended serial identifier provided a user;

providing, based on the detected rejection indication, instructions to the serial identifier generation component to generate another recommended serial identifier;

transmitting, using the computer server and upon receiving the another recommended serial identifier from the serial identifier generation component, instructions to the user computing device to display the another recommended serial identifier; and establishing, responsive to receiving user authorization input, the another recommended serial identifier as the serial identifier for the product.

18. The computer system of claim 15, wherein the establishing comprises automatically establishing, without receipt of any additional user input, the recommended serial identifier as the serial identifier for the product.

19. The computer system of claim 15, further comprising initiating a duplication protocol on the recommended serial identifier, wherein the initiating the duplication protocol comprises:

accessing a database of active serial identifiers associated with other products;

comparing the recommended serial identifier to any of the active serial identifiers;

determining whether a match exists between the recommended serial identifier and any of the active serial identifiers; and providing, responsive to determining that the match exists, an instruction to the serial identifier generation component to generate another recommended serial identifier.

20. A non-transitory computer-readable medium storing instructions executable by one or more computer processors of a computer server, the instructions when executed by the one or more computer processors cause the one or more computer processors to perform operations comprising:

receiving, at an application platform associated with a computer server, a request to programmatically generate a unique context-based serial identifier for a product;

obtaining by a serial identifier generation component associated with the computer server, context data associated with the product;

generating, by a serial identifier generation component using a machine learning model and based on the context data, output comprising a recommended serial identifier and indication of a strength of the recommended serial identifier, wherein the machine learning model is trained using a training dataset that is generated by:

identifying training context data, performing normalization operation on the training context data to generate normalized context data, determining a classification label for the training context data based at least in part on the normalized context data, wherein the classification label is indicative of a likelihood of counterfeit activity, and generating the training dataset based at least in part on the normalized context data and the classification label, wherein training the machine learning model comprises applying the training dataset to a machine learning based algorithm to train an untrained machine learning model for determining configuration parameters for outputting context-based serialization task based at least in part on the likelihood of counterfeit activity, electronically transmitting the output comprising the recommended serial identifier a portal corresponding to the application platform;

providing, in response to determining that the recommended serial identifier is associated with a complex set of configuration parameters, an alternate product distribution path that avoids suspect geographic locations of high counterfeit activity; and establishing, the recommended serial identifier as the unique context-based serial identifier for the product.

* * * * *